United States Patent
Uppal et al.

(10) Patent No.: US 8,588,112 B2
(45) Date of Patent: Nov. 19, 2013

(54) TRANSMISSION FOR HALF-DUPLEX RELAY IN FADING CHANNEL AND RATELESS CODE CONFIGURATION

(75) Inventors: Momin Uppal, Islamabad (PK); Guosen Yue, Plainsboro, NJ (US); Xiaodong Wang, New York, NY (US)

(73) Assignee: NEC Laboratories America, Inc., Princeton, NJ (US)

( * ) Notice: Subject to any disclaimer, the term of this patent is extended or adjusted under 35 U.S.C. 154(b) by 259 days.

(21) Appl. No.: 13/004,060

(22) Filed: Jan. 11, 2011

(65) Prior Publication Data

US 2011/0170457 A1    Jul. 14, 2011

Related U.S. Application Data

(60) Provisional application No. 61/293,847, filed on Jan. 11, 2010.

(51) Int. Cl.
*H04L 7/00* (2006.01)
*H04L 25/52* (2006.01)
*H04B 7/26* (2006.01)

(52) U.S. Cl.
USPC ........... 370/277; 370/315; 370/492; 370/501; 375/211; 455/7

(58) Field of Classification Search
USPC ........................ 370/277; 375/240.03, 240.24
See application file for complete search history.

(56) References Cited

U.S. PATENT DOCUMENTS

| | | | |
|---|---|---|---|
| 7,673,219 B2 * | 3/2010 | Molisch et al. | 714/772 |
| 8,243,756 B2 * | 8/2012 | Chakrabarti et al. | 370/477 |
| 8,315,306 B2 * | 11/2012 | Xu et al. | 375/240.03 |

OTHER PUBLICATIONS

Ozgun Y. Bursalioglu, Jan. 16, 2009, Joint Source-Channel Codind at the Application Layer for Parallel Gaussian Sources.*

* cited by examiner

*Primary Examiner* — Hassan Kizou
*Assistant Examiner* — Emmanuel Maglo
(74) *Attorney, Agent, or Firm* — Joseph Kolodka

(57) ABSTRACT

In one aspect of the invention, a method for transmission in a wireless communication system includes selecting by a signal destination one of a source-destination direct transmission, a decode-forward relay transmission, and a compress-forward relay transmission, responsive to channel gains between a signal source and a relay, between the signal source and the signal destination, and between the relay and the signal destination; informing a selected transmission mode from the selecting step to the signal source and the relay; and operating in the selected transmission mode by the relay.

5 Claims, 3 Drawing Sheets

TRANSMISSION FOR HALF-DUPLEX RELAY IN FADING CHANNEL AND RATELESS CODE CONFIGURATION

This application claims the benefit of U.S. Provisional Application No. 61/293,847, entitled "Rateless Coded Protocol for Half-Duplex Wireless Relay Channel", filed on Jan. 11, 2010, the contents of which are incorporated by reference herein.

FIELD OF THE INVENTION

The present invention relates generally to wireless communications, and more particularly, to transmission for half-duplex relay in fading channel and rateless code design.

BACKGROUND OF THE INVENTION

In a three-node relay network where all channels experience quasi-static Rayleigh fading and where the instantaneous channel state information is not available at the transmitters, a situation can occur where the network does not have a stringent delay constraint. In other words, the destination can potentially wait for a long period of time to decode the information from the source.

Most works have considered the non-fading case where nodes have knowledge about all channel conditions. The compress-forward relay and low-density parity-check (LDPC) code design has been considered for Gaussian channels. For the few works that consider the fading case, only the so-called decode-forward scheme has been considered, where the relay attempts to decode the source message before forwarding it to the destination. The rateless code with a precoder, i.e., Raptor code, has been studied for a general 2-node link channel without relaying.

Accordingly, there is a need for a transmission relaying protocol and practical coding for a quasi-static fading environment, which provides significant gains over the traditional point to point communication from the source to the destination.

SUMMARY OF THE INVENTION

In one aspect of the invention, a method for transmission in a wireless communication system includes selecting by a signal destination one of a source-destination direct transmission, a decode-forward relay transmission, and a compress-forward transmission, responsive to channel gains between a signal source and a relay, between the signal source and the signal destination, and between the relay and the signal destination; informing a selected transmission mode from the selecting step to the signal source and the relay; and operating in the selected transmission mode by the relay.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to use of a combination of rateless coded versions of two popular relaying strategies, namely decode-forward and compress-forward and employs very limited feedback from the destination to indicate to the source and the relay which relaying strategy to use for the current channel conditions. The invention is implemented using practical Raptor codes, the degree distributions for which are optimized to maximize the average throughput over the channel ensemble. The configuration of these degree distributions is formulated as a convex optimization problem.

Figure 1:
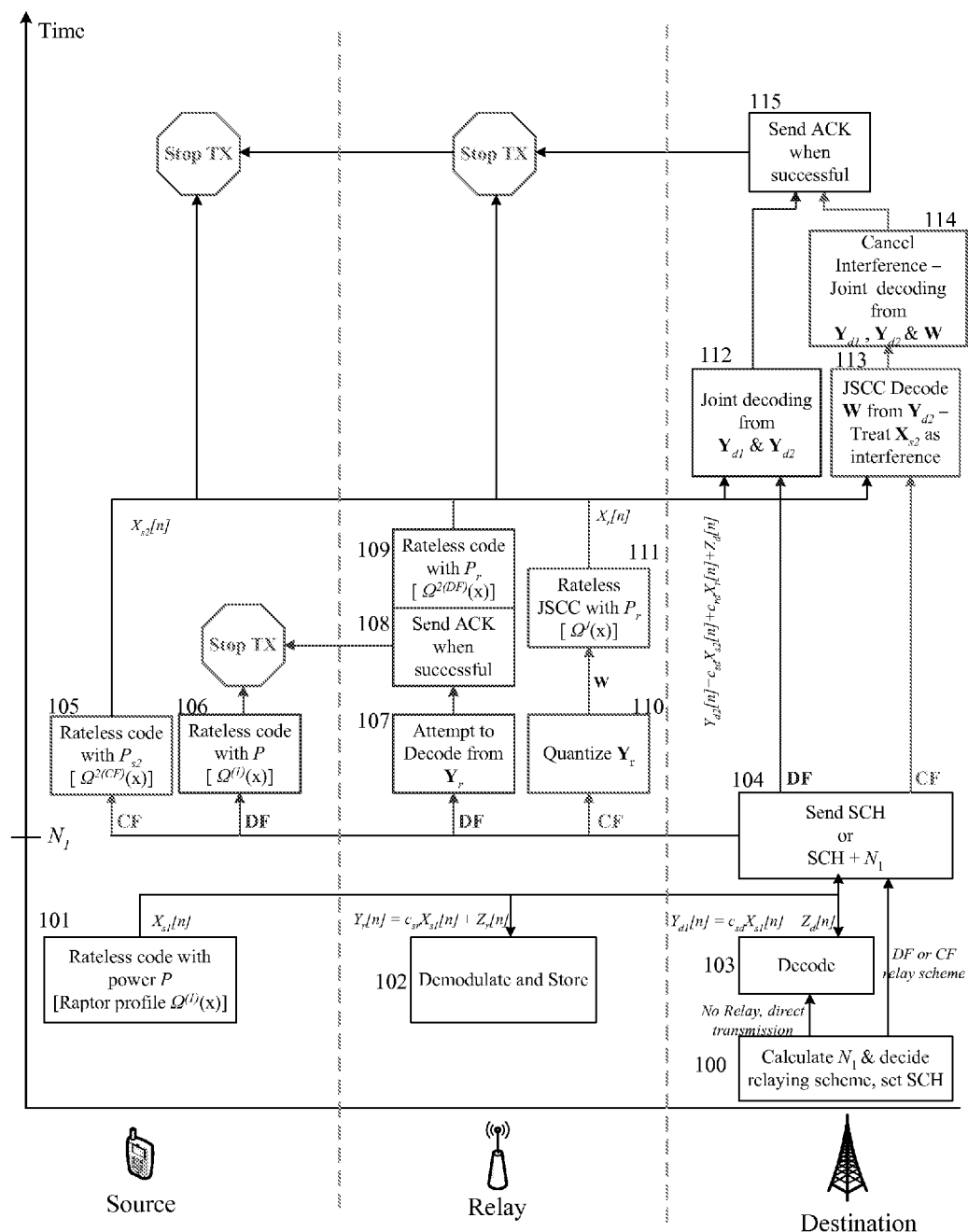
FIG. 1 is a diagram of a rateless coded relay protocol using both compress-forward and decoding-forward relaying, in accordance with the invention.

The inventive relaying protocol shown in FIG. 1 uses a combination of the two popular relaying strategies, namely decode-forward (DF) and compress-forward (CF) in conjunction with rateless Raptor codes. The inventive protocol is as follows.

It is assumed that while the channel conditions are not known at the transmitters, all channel conditions are known perfectly at the destination (100). Depending on the current channel realization, the relaying scheme which results in a higher achievable rate should be selected. However, with no channel state information at the transmitters, the nodes cannot (a) determine whether to employ DF or CF coding at the relay, or (b) determine when the relay should stop receiving and start transmitting. Thus, using information theoretic analysis, the destination is able to determine whether CF or DF results in a higher achievable rate. A 1-bit feedback signal, denoted as SCH, is set to represent either CF or DF relay scheme. At the same time, it is able to determine the optimum number of symbols the relay should receive before it starts transmitting.

The source initially encodes its information using rateless code with a degree distribution $\Omega^{(1)}(x)$ and utilizes the total system power P to transmit the BPSK modulated coded symbols which are received at the relay and the destination after passing through the noisy channel as the sequences $Y_r$ and $Y_{d1}$, respectively (101). Note that since the source has no knowledge about the channel conditions, it will employ the same degree distribution $\Omega^{(1)}(x)$ for its Raptor code, regardless of which relaying scheme, if any, will be employed in the future.

The half-duplex operation at the relay is considered, so the relay initially only listens in on the source transmission and does not transmit itself (102). Based on the received signal $Y_r$, the relay demodulates and stores the demodulated information.

In order to circumvent the two problems listed above, it is proposed for the destination to broadcast a feedback after it has received $N_1$ symbols—the optimum number of symbols required by the relay before it should start transmitting (104). The feedback signal, SCH, is heard by the relay as well as the source, and contains the information as to whether CF or DF scheme should be employed. In addition, the time at which this feedback is sent also conveys information about the number of symbols the relay should receive before it starts transmitting. Note that alternatively we can send the information of $N_1$ as additional feedback if the transmission delay is considered. In this case the signal SCH and feedback of $N_1$ can be sent at any time before $N_1$, e.g., at the beginning of the transmission block which is only need to updated when channels are changed.

Rateless Coded Compress-Forward

If the SCH signal indicates that CF should be employed, the relay quantizes the received signal to W using a binary quantizer or other type of quantizer (110) and then joint source-channel codes the quantized sequence using a Raptor code of degree distribution $\Omega^J(x)$ and starts transmitting the coded BPSK modulated symbols using power $P_r$ (111). At the same time, the source starts using another Raptor code of degree distribution $\Omega^{(2)CF}(x)$ and transmits the BPSK modulated symbols using an adjusted power $P_{s2}$ such that $P=P_r+P_{s2}$ (105). The transmissions from the source and the relay go over a multiple-access channel and are received as $Y_{d2}$ at the destination. The powers $P_r$ and $P_{s2}$ are not functions of the instantaneous channel realizations—rather they are fixed to optimize the average throughput.

Figure 2:
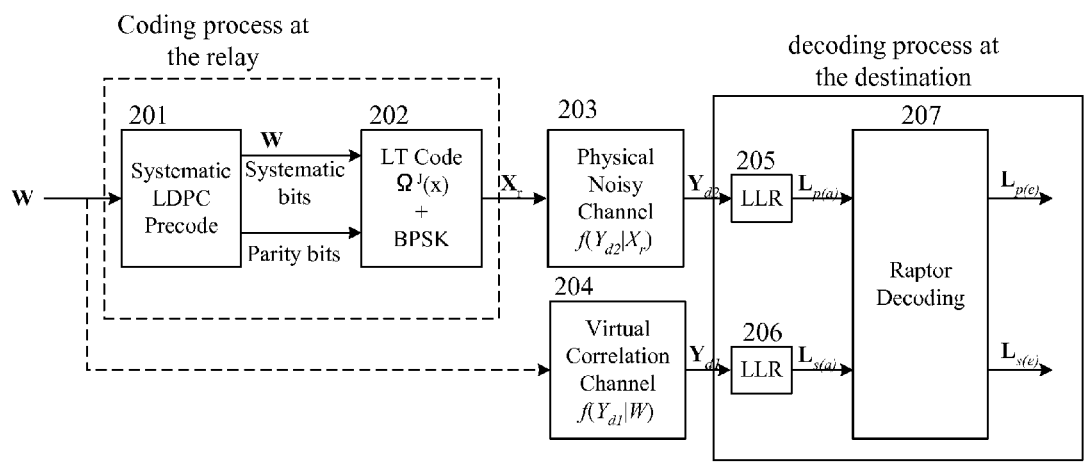
FIG. 2 is a diagram of joint source-channel coding of the quantized indices W using Raptor codes with $Y_{d1}$ as the side-information available at the decoder but not the encoder, in accordance with the invention.

The destination first attempts to recover the quantized sequence W. It does that as shown in FIG. 2 by using $Y_{d2}$, treating the transmission from the source as binary interference (113). In addition, $Y_{d1}$ is correlated with W and therefore $Y_{d1}$ can be thought of as the output of a virtual correlation channel with W as the input. Thus in decoding W, the destination using $Y_{d2}$ to calculate the log-likelihood ratios (LLRs) for the coded parity bits and uses $Y_{d1}$ to calculate the LLRs for the systematic bits. The Raptor decoder generates extrinsic LLRs $L_{p(e)}$ and $L_{s(e)}$ for the parity and systematic bits, respectively. Using these extrinsic LLRs, as well as $Y_{d1}$ and $Y_{d2}$, the destination then attempts to recover the original source information (114). If the original information is successfully decoded, the destination generates an ACK signaling to the source as well as the relay to stop transmitting. If on the other hand decoding is unsuccessful, it waits for the source and the relay to transmit more symbols before attempting to decode again (115).

Rateless Coded Decode-Forward

If the SCH signal indicates that DF should be employed, the source continues to transmit rateless coded bits with power P and using the degree profiles $\Omega^{(1)}(x)$ (106). The relay starts attempting to decode the source transmission based on the received signal $Y_r$ (107). It continues to receive symbols from the source until successful decoding occurs. At this point in time, it sends an ACK to the source which stops transmitting (108). All the transmission power is now allocated to the relay which re-encodes the decoded version and starts transmitting to the destination using a BPSK modulated Raptor code with a degree profile $\Omega^{(2)DF}(x)$ (109). The relay continues to transmit until the destination generates an ACK.

Finally, for the channel realizations the destination determines direct transmission to be the best choice, it never broadcasts the SCH signal. The relay continues to wait for SCH, which never comes, and thus the relay never transmits. The destination attempts to decode directly from the source transmission and sends an ACK once successful (103). At this point, the source stops transmitting, thus completing the packet transmission.

It is noted that although the inventive relay protocol for quasi-static fading channels employs rateless codes, other codes with incremental redundancy, e.g. turbo codes, LDPC codes, can also be applied.

Referring now to FIG. 2, there is shown the encoding process at the relay and transmission through both the source and the relay form a joint source-channel coding for the quantized signal W.

The relay first encodes the quantized sequence using a systematic LDPC code (as a precoder) (201). 202: The systematic bits W and the parity bits are then coded using a rateless LT code using the profile $\Omega^J(x)$ and modulated (202). BPSK modulation is used in this example. The modulated symbol sequence $X_r$ are then sent to the destinations. Through the physical noisy channel, the signal $Y_{d2}$, the noisy version of $X_r$, is received at the destination (203).

The received signal $Y_{d1}$ at the destination from the source are correlated with the quantized sequence W at the relay since they are both the noisy version of the original data sent from the source (204). So $Y_{d1}$ can be viewed at the received signal for W from a virtual correlation channel $f(Y_{d1}|W)$. The destination first attempts to recover the quantized sequence W. The destination uses $Y_{d2}$ to calculate the log-likelihood ratios (LLRs) for the coded parity bits and uses $Y_{d1}$ to calculate the LLRs for the systematic bits (205, 206). The Raptor decoder then decodes W based on LLRs obtained from $Y_{d1}$ and $Y_{d2}$ and generates extrinsic LLRs $L_{p(e)}$ and $L_{s(e)}$ for the parity and systematic bits, respectively, which can be used to decoder the original information from the source (207).

Degree Profile Optimizations

The rateless Raptor code degree profiles $\Omega^{(1)}(x)$, $\Omega^J(x)$, $\Omega^{(2)CF}(x)$ and $\Omega^{(2)DF}(x)$ are optimized to maximize the overall throughput averaged over the channel ensemble (the same degree profiles are used for all channel realizations). Using the extrinsic mutual information transfer (EXIT) chart strategy, and the Gaussian assumption, the design is formulated as a non-linear but convex optimization problem.

We formulize the optimization of rateless Raptor degree profiles by maximizing the average rate or throughput, $R_{avg}$ for relay fading channels with the constraints for successful rateless decoding obtained by the EXIT chart analysis, which can be summarized as $$\max R_{avg} = \sum_{c \in C_d} p(c)R_d(c) + \sum_{c \in C_{DF}} p(c)R_{DF}(c) + \sum_{c \in C_{CF}} p(c)R_{CF}(c)$$

(I) Convergence constraints for direct transmission, i.e., the channel condition $c \in C_d$, given by $$\sum_{d=1}^{D} \Omega_d^{(1)} T_d(I, C(c_{sd}^2 P))) + R_d(c)\ln(1-I) > 0 \ \forall I \in [0, I_{max}].$$

(II) Convergence constraints for DF relaying employed, i.e., the channel condition $c \in C_{DF}$, given by $$\sum_{d=1}^{D} \Omega_d^{(1)} T_d(I, C(c_{sr}^2 P))) + R_{SR}(c)\ln(1-I) > 0$$

$$\sum_{f=1}^{D} d[\Omega_d^{(1)}(\tilde{R}_{DF}(c)-1)T_d(I, C(c_{sd}^2 P_{s1})) + \Omega_d^{(2)DF}T_d(I, C(c_{rd}^2 P_r))] >$$

$$(1-\tilde{R}_{DF}(c))R_{SR}(c)\ln(1-I) \ \forall I \in [0, I_{max}],$$

(III) Convergence constraints for CF relaying employed, i.e., the channel condition $c \in C_{CF}$, given by $$\sum_{d=1}^{D} d\Omega_d^J T_d(I, I_r(c)) + (\tilde{R}^J(c)-1)\ln\left(\frac{1-I}{1-I_l(c)}\right) > 0 \ \forall I \in [0, I_{max}]$$

$$\sum_{d=1}^{D} d[R^J(c)R_P\Omega_d^{(1)}T_d(I, I_r^{(1)}(c)) + \Omega_d^{(2)CF}T_d(I, I_r^{(2)}(c))] +$$

$$(1+R^J(c)R_p)R_{CF}(c)\ln(1-I) > 0 \ \forall I \in [0, I_{max}]$$

Figure 3:
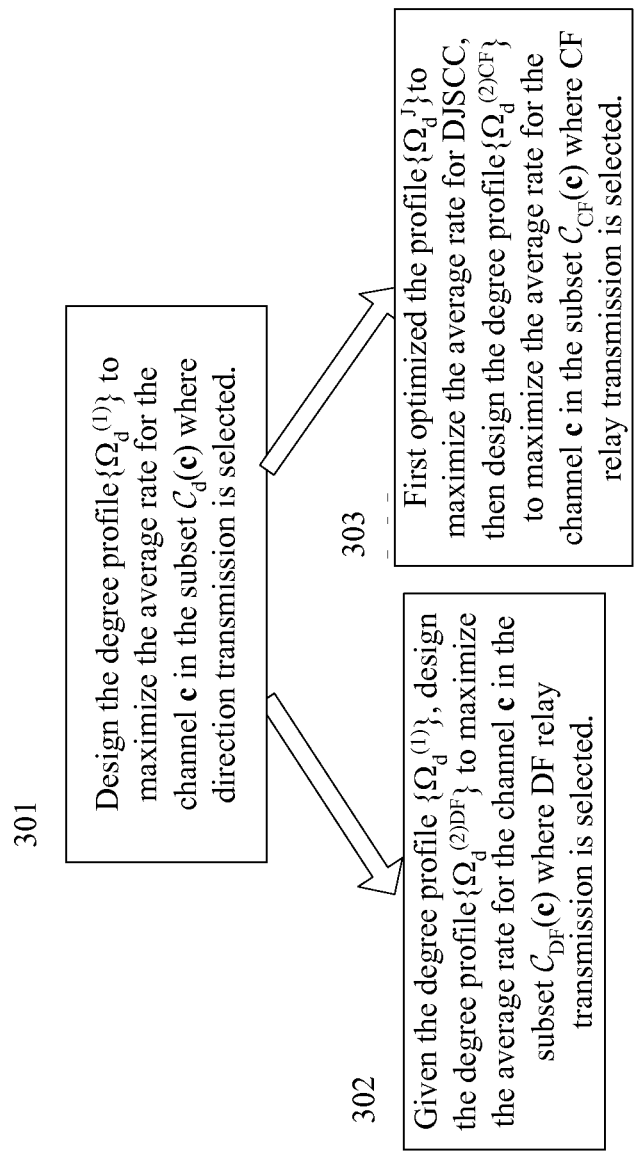
FIG. 3 is a diagram of optimization procedures for rateless code profiles, in accordance with the invention.

However, since above optimization is not convex, we consider the following simplified suboptimal design process as shown in FIG. 3.

Optimize $\{\Omega_d^{(1)}\}$ for direction transmission to maximize the objective $\Sigma_{c\in}c_d p(c)R_d(c)$, i.e., the first term in $R_{avg}$, subject to the constraints in (I) in the optimization (301). Both the objective and the constraints are linear in $\{\Omega_d^{(1)}\}$ and $\{R_d(c)\}$. The optimization can be solved by linear programming. Given $\{\Omega_d^{(2)}\}$ being designed, the problem of maximizing the overall average throughput is separable, i.e., the degree profiles for DF and CF can now be designed independently of each other For the DF relay, to design the code coefficients $\{\Omega_d^{(2)DF}\}$ for the relay transmission, we first find maximum rate $R_{SR}(c)$ for the pre-designed $\{\Omega_d^{(1)}\}$ using the first constraint in (II) (302). We then optimize $\{\Omega_d^{(2)DF}\}$ to maximize the objective function $R_{avg}^{DF} = \Sigma_{c\in}c_{DF} p(c)R_{DF}(c)$, i.e., the second term in $R_{avg}$, subject to the second convergence constraint in (II). The optimization problem is convex so that it can be solved by convex optimization tool.

For the CF relay, we first configure the DJSCC degree profile $\{\Omega_d^J\}$ to maximize the average theoretical rate for DJSCC (but with practical DJSCC codes) $\Sigma_{c\in}c_{CFp(c)}[\alpha^J I_1(c) + \overline{\alpha}^J I_2(c)]$ with $$\alpha^J = \frac{R^J(c)R_P}{1+R^J(c)R_P},$$

subject to the first convergence constraint in (III) (303). The optimization is convex and can be solved by convex optimization tool. We then design the code profiles $\{\Omega_d^{(2)DF}\}$ to maximize $\Sigma_{c\in}c_{CF} p(c)R_{CF}(c)$, i.e., the $3^{rd}$ term in $R_{avg}$, subject to the second convergence constraint in (III), which can be solved using linear programming.

Figure 4:
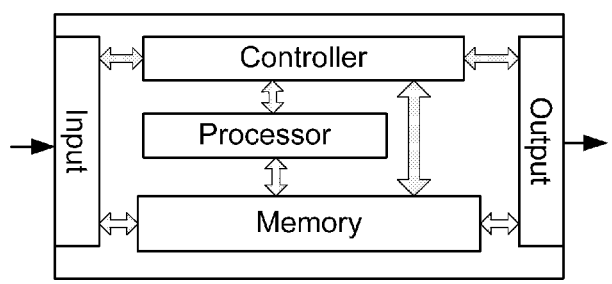
FIG. 4 is a diagram of an exemplary machinery plot for a wireless transceiver system representing the source, relay and destination nodes, in accordance with the invention.

Referring to FIG. 4, there is shown a machinery plot for a wireless transceiver system which can be used to implement the functions of the source, relay, and destination nodes. The procedures or the functions described in FIG. 1 are implemented in the machine shown in FIG. 4 depending on which it operates as, e.g., a source, relay or the destinations. When the wireless system operates as a source, the aspects 101, 105, 106 are implemented in the system. The controller control the processing (for encoding, power allocation), output (for transmitting signal), and also memory storing/retrieving. Similarly, the aspects 102, 107-111 are implemented in the machine for the relay and the aspects 100, 103, 104, 112-114 are implemented in the machine for the destination.

It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for transmission in a wireless communication system comprising the steps of:
    selecting by a signal destination one of a source-destination direct transmission, a decode-forward relay transmission, and a compress-forward transmission, responsive to channel gains between a signal source and a relay, between said signal source and said signal destination, and between said relay and said signal destination;
    informing a selected transmission mode from said selecting step to said signal source and said relay; and
    operating in said selected transmission mode by said relay;
    wherein said selecting step comprises said signal destination broadcasting a feedback after receiving an optimum number of symbols required by said relay before said broadcasting, said feedback signal being heard by said relay link, said signal source and including information for selecting one of said decode-forward and said compress-forward transmission; and
    wherein said optimum number of symbols the relay should receive before it starts transmitting being sent as additional feedback responsive to a transmission delay consideration in said selecting step, said feedback signal and said additional feedback being sent anytime before beginning of said optimum number of symbols at the beginning of a transmission block.

2. The method of claim 1, wherein said compress forward transmission comprises said relay quantizing a received signal W using a quantizer and then joint source-channel codes, the quantized sequence using a Raptor code of a first degree distribution.

3. The method of claim 1, wherein said compress-forward transmission further comprises said relay starting to transmit coded modulated symbols using power $P_r$, while at the same time, said signal source starting to use a Raptor code of a second degree distribution and transmitting said modulated symbols using an adjusted power.

4. The method of claim 1, wherein said compress-forward transmission further comprises transmission from said source and said relay being over a multiple-access channel and received as $Y_{d2}$ at said signal destination, a power and adjusted power being fixed for optimizing average throughput.

5. The method of claim 1, wherein said compress-forward transmission further comprises said signal destination first attempting to recover a quantized sequence W by treating transmission from said signal source as interference.

\* \* \* \* \*